> United States Patent Office 3,022,323
Patented Feb. 20, 1962

3,022,323
7-SUBSTITUTED THIO STEROIDS OF THE PREGNENE SERIES
Robert E. Schaub, Paramus, and Martin J. Weiss, Oradell, N.J., assignors to American Cyanamid Company, New York, N.Y., a corporation of Maine
No Drawing. Filed July 22, 1960, Ser. No. 44,519
10 Claims. (Cl. 260—397.3)

This invention relates to new steroid compounds. More particularly, it relates to 7-sulfur substituted steroids of the pregnene series.

The new compounds of the present invention can be illustrated by the following general formula:

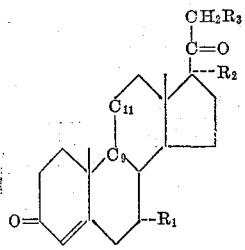

in which $R_1$ is selected from the group consisting of lower alkylthio, thiocyano, lower alkylsulfinyl and lower alkylsulfonyl radicals, $R_2$ is selected from the group consisting of hydrogen and hydroxyl radicals, $R_3$ is selected from the group consisting of hydrogen, hydroxyl and lower alkanoyloxy radicals and $C_9$–$C_{11}$ is a trivalent radical selected from the group consisting of

and

The 7-sulfur substituted steroids of this invention are, in general, white crystalline solids having ultraviolet absorption maxima at 237–241 mμ. The 7-sulfur substituted compounds of the invention, in general, show higher molecular rotation values than the corresponding 7-unsubstituted parent derivatives.

The novel 7-sulfur substituted steroids of the present invention can be prepared by treating a 6-dehydro-$\Delta^4$-3-ketone with a lower alkyl mercaptan or thiocyanic acid. Generally, the reactants are contacted in solution in a solvent such as acetic acid in the presence of a strong mineral acid such as, for example, hydrochloric acid. The reaction ordinarily is carried out at a comparatively low temperature varying from 0 to 25° C. over a period of time ranging from about 12 hours to several days. Thiolic acid addition may be effected by heating the 6-dehydro-$\Delta^4$-3-ketone in excess thiolic acid for about 16 hours.

The lower alkylsulfinyl (sulfoxide) derivatives are prepared by treating a suspension or solution of a lower alkylthio derivative in an inert medium such as methylene dichloride, with a slight excess (over one equivalent) of ethereal monoperphthalic acid at room temperature for a period of about 24 hours. The lower alkylsulfonyl (sulfone) derivatives are obtained by a similar treatment of the corresponding lower alkylsulfinyl derivatives with a slight excess (over one equivalent) of monoperphthalic acid or by treatment of the corresponding lower alkylthio derivative with a slight excess (over two equivalents) of monoperphthalic acid. The reaction period is usually 48 to 72 hours at room temperature.

Following completion of the reaction, the products are isolated and purified by well-known methods which are described in detail in the examples hereinafter.

The process of this invention proceeds under steric influences and stereoisomers are formed, however, one is obtained in predominate amount. The isomer obtained in predominant amount has in each case been characterized herein as possessing the alpha configuration of the 7-lower alkylthio, thiocyano, lower acylthio, lower alkylsulfinyl or lower alkylsulfonyl group. This configuration has been designated in order to provide a more complete exposition of the present invention, and in order that the specification shall constitute a more useful contribution to the art. However, the designated configuration of the 7-lower alkylthio, thiocyano, lower acylthio, lower alkylsulfinyl or lower alkylsulfonyl group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

The compounds of the present invention inhibit growth of certain microorganisms. When tested by agar dilution techniques the compounds inhibit growth of the fungi such as, *Trichophyton mentogrophytes*, *Botrytis cinerea* and *Microsporum gypseum* and the yeast such as, *Saccharomyces carlbergensis*. The present compounds therefore are useful as fungicides and in the control of yeast growth. In addition, those compounds of the invention having an oxygen function at position 11 of the steroid nucleus have adrenocorticoid activity and are useful in the treatment of arthritis, various inflammatory diseases and dermatological disorders.

The following examples illustrates in detail the preparation of representative 7-sulfur substituted compositions of the present invention.

EXAMPLE I

*7α-methylthiocortisone 21-acetate (21-acetoxy-17α-hydroxy-7α-methylthio-4-pregnene-3,11,20-trione)*

To a cold solution of 3 g. of 21-acetoxy-17α-hydroxy-4,5-pregnadiene-3,11,20-trione [Mattox et al., J. Biol. Chem., 197, 261 (1952)] in 300 cc. of glacial acetic acid is added 6 cc. of concentrated hydorchloric acid, and then 15 cc. of methylmercaptan. The solution is kept at 8° C. for three days, after which time the mixture is concentrated to a syrup under reduced pressure. The syrup is dissolved in methylene chloride. After neutralization with sodium bicarbonate, the methylene chloride solution is washed with water, dried over anhydrous magnesium sulfate and concentrated to dryness under reduced pressure. The residue is crystallized from acetone-petroleum solution to give 1.43 g. (43%) of product, melting point 244–245° C. (dec.).

Another preparation, carried out according to the same procedure, except that 1 g. of 21-acetoxy-17α-hydroxy-4,5-pregnadiene-3,11,20-trione starting material and appropriately reduced quantities of other reactants and solvelts are used for a reaction time reduced to 22 hours, yields 235 mg. (21%) of product, melting point 243–245° C. Several recrystallizations of this material from acetone-petroleum ether solution gives a white crystalline product, melting point 246–248° C. (dec.); $[\alpha]_D^{25}+132°$ (c. 2%, chloroform);

$\lambda_{max.}^{MeOH}$ 239 m$\mu$ ($\epsilon$ 15,500); $\nu_{max.}^{KBr}$ 3380, 1760, 1730, 1710, 1650, 1630, 1380, 1230 cm.$^{-1}$

EXAMPLE II

*7α-ethylthiocortisone 21-acetate (21-acetoxy-17α-hydroxy-7α-ethylthio-4-pregnene-3,11,20-trione)*

To a cold solution of 500 mg. of 21-acetoxy-17α-hydroxy-4,6-pregnadiene-3,11,20-trione in 25 cc. of glacial acetic acid is added 1 cc. of concentrated hydrochloric acid and then 3 cc. of ethylmercaptan. The resulting red solution is kept at 5–7° C. for 24 hours. Recovery of product according to the procedures described immediately above gives 201 mg. (35%) of product, melting point 229–231° C. (dec.) Recrystallization from acetone-petroleum ether solution gives a white crystalline product, melting point 235–237° C. (dec.); $[\alpha]_D^{25}+129°$ (c. 2.07% chloroform);

$\lambda_{max.}^{MeOH}$ 239 m$\mu$ ($\epsilon$ 13,000); $\nu_{max.}^{KBr}$ 1760, 1735, 1710, 1650, 1630, 1235 cm.$^{-1}$

EXAMPLE III

*7α-thiocyanocortisone 21-acetate (21-acetoxy-17α-hydroxy-7α-thiocyano-4-pregnene-3,11,20-trione)*

Treatment of 1 g. of 21-acetoxy-17α-hydroxy-4,6-pregnadiene-3,11,20-trione with 4.8 cc. of concentrated hydrochloric acid and 3 g. of potassium thiocyanate in 75 cc. of glacial acetic acid according to the procedure of Example I gives 650 mg. of crystalline material, melting point 200–203° C. (dec.). Recrystallization from acetone-petroleum ether gives 189 mg. (19%) of starting material, melting point and mixed melting point 231–234°. Evaporation of the filtrate and recrystallization of the residue from the same solvents gives 420 mg. (37%) of product, melting point 178–181° (dec.). Two additional recrystallizations give white crystals, melting point 190–191° (dec.); $[\alpha]_D^{25}+133°$ (c. 1.2% in CHCl$_3$);

$\lambda_{max.}^{MeOH}$ 238 m$\mu$ ($\epsilon$=13,100); $\nu_{max.}^{KBr}$ 3450, 2060, 1750, 1710, 1650, 1630, 1240 cm.$^{-1}$

EXAMPLE IV

*7α-acetylthio-9α-fluorohydrocortisone 21-acetate (21-acetoxy-7α-acetylthio-11β,17α-dihydroxy-9α-fluoro-4-pregnene-3,20-dione)*

A mixture of 3 g. of 21-acetoxy-9α-fluoro-11β,17α-dihydroxy-4-pregnene-3,20-dione [Fried et al., J. Am. Chem. Soc., 79, 1130 (1957)], 2.9 g. of chloranil (2,3,5,6-tetrachlorobenzoquinone), and 225 cc. of freshly distilled t-butanol is flushed with nitrogen and then refluxed for 18 hours; solution is complete in approximately 30 minutes. The cooled solution is diluted with 500 cc. of chloroform, washed with several small portions of ice-cold 5% sodium hydroxide, then with water, dried with anhydrous magnesium sulfate and evaporated to dryness under reduced pressure leaving a semi-solid. Recrystallization from acetone-petroleum ether furnishes 1 g. (33%) of 21-acetoxy-9α-fluoro-11β,17α-dihydroxy-4,6 - pregnadiene-3,20-dione (6-dehydro-9α-fluorohydrocortisone-21-acetate), melting point 215–216° C. Several recrystallizations from the same solvents raises the melting point to 219–221°; $[\alpha]_D^{30}+138°$ (c. 1.01 in CHCl$_3$);

$\lambda_{max.}^{MeOH}$ 280 m$\mu$ ($\epsilon$=26,700); $\nu_{max.}^{KBr}$ 3380, 1730, 1650, 1620, 1590, 1235 cm.$^{-1}$ A suspension of 1 g. of 6-dehydro-9α-fluorohydrocortisone 21-acetate in 2 cc. of freshly distilled thiolacetic acid is heated under reflux on the steam bath for 22 hours; solution being complete at the boiling point. The solution is evaporated to dryness. The residual glass is crystallized from ether-acetone and the white crystalline material is collected by filtration to give 665 mg. (56%) of product, melting point 253–255° (dec.). Two recrystallizations from acetone-petroleum ether raises the melting point to 256–258° (dec.); $[\alpha]_D^{25}-21°$ (1.1% in CHCl$_3$);

$\lambda_{max.}^{MeOH}$ 236 m$\mu$ ($\epsilon$ 19,850); $\nu_{max.}^{KBr}$ 2.90, 5.71, 5.78, 5.95, 6.01 6.04 (shoulder), 8.13$\mu$

EXAMPLE V

*7α-methylthiodeoxycorticosterone acetate (21-acetoxy-7α-methylthio-4-pregnen-3,20-dione)*

Treatment of 1 g. of 6-dehydrodeoxycorticosterone acetate [Sondheimer et al., J. Am. Chem. Soc., 75, 5932 (1953)], with 2 cc. of concentrated hydrochloric acid and 6 cc. of methylmercaptan in 75 cc. of glacial acetic acid according to the procedure described in Example I gives the product, melting point 220–223° C. Recrystallization from acetone-petroleum ether gives white crystals, melting point 222–225° C.

$\lambda_{max.}^{KBr}$ 5.73, 5.80, 6.00, 6.17, 8.17$\mu$

EXAMPLE VI

*7α-methylthioprogesterone (7α-methylthio-4-pregnene-3,20-dione)*

Treatment of a solution of 688 mg. of 4,6-pregnadiene-3,20-dione [Sondheimer et al., J. Am. Chem. Soc., 75, 5932 (1953)], in 55 cc. of glacial acetic acid with 2 cc. of concentrated hydrochloric acid and 7 cc. of methylmercaptan as described above in Example I, except that the reaction time was four days, gives 246 mg. (31%) of product, melting point 154–156°. Recrystallization from acetone-petroleum ether gives white crystals, melting point 159–160°; $[\alpha]_D^{25}+72.5°$ (1.1% in CHCl$_3$);

$\lambda_{max.}^{MeOH}$ 240 m$\mu$ ($\epsilon$=15,500); $\nu_{max.}^{KBr}$ 1700, 1675, 1620 cm.$^{-1}$

EXAMPLE VII

*7α-methylsulfinylprogesterone*

To a solution of 7α-methylthioprogesterone prepared as in Example VI (100 mg.) in 3 ml. of methylene chloride is added 1.1 molar equivalents of monoperphthalic acid. The reaction mixture, protected from moisture, is allowed to stand at room temperature for 24 hours, during which period phthalic acid separated. The solution shows a negative test with 20% aqueous potassium iodide solution. The phthalic acid is collected by filtration. The filtrate is washed with dilute aqueous sodium carbonate solution, and then with water. After drying over anhydrous magnesium sulfate, the solvent is evaporated at reduced pressure. The residue is triturated with petroleum ether (boiling point 60–70° C.) and the product (57%) is collected by filtration. For analysis, the product is recrystallized from acetone-petroleum ether; melting point 179–180°; $[\alpha]_D+76.3$ (0.5% in chloroform);

$\lambda_{max.}^{MeOH}$ 242 m$\mu$ ($\epsilon$ 12,200); $\lambda_{max.}^{KBr}$ 5.84, 5.97, 6.17, 9.67$\mu$

EXAMPLE VIII

*7α-methylsulfinylcortisone 21-acetate*

Following the procedure of Example VII, 7α-methylthiocortisone 21-acetate (Example I) is treated with 1.1 molar equivalents of monoperphthalic acid to give the product in 65% yield. Trituration with ether gives material melting at 195° C.; $[\alpha]_D+128°$ (0.2% in dioxane);

$\lambda_{max.}^{MeOH}$ 235 m$\mu$ ($\epsilon$ 13,100); $\lambda_{max.}^{KBr}$ 2.94, 5.69, 5.76, 5.83, 5.95, 6.03, 6.14, 8.10, 9.60$\mu$

EXAMPLE IX

*7α-methylsulfonylcortisone 21-acetate*

Using the procedure of Example VIII, 7α-methylsulfinylcortisone 21-acetate (Example IX) is treated with 1.1 molar equivalents of monoperphthalic acid for 48 hours at room temperature. The product (60%) is recrystallized from acetone-petroleum ether (boiling point 60–70°); melting point 184°; $[\alpha]_D +103°$ (0.6% in pyridine); $\lambda_{max.}^{MeOH}$ 236 m$\mu$ ($\epsilon$ 18,500); $\lambda_{max.}^{KBr}$ 2.86, 5.70, 5.77, 5.86, 5.94, 6.14, 7.68, 7.93, 8.10, 8.87, 13.0$\mu$

We claim:
1. A compound having the formula:

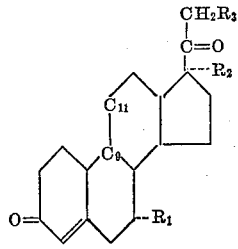

in which $R_1$ is selected from the group consisting of lower alkylthio, thiocyano, lower alkylsulfinyl and lower alkylsulfonyl radicals, $R_2$ is selected from the group consisting of hydrogen and hydroxyl radicals, $R_3$ is selected from the group consisting of hydrogen, hydroxyl and lower alkanoyloxy radicals and when $R_3$ is hydrogen $R_2$ is also hydrogen and $C_9$–$C_{11}$ is a trivalent radical selected from the group consisting of:

and 2. 7α-methylthiocortisone 21-acetate.
3. 7α-ethylthiocortisone 21-acetate.
4. 7α-thiocyanocortisone 21-acetate.
5. 7α-methylthiodeoxycorticosterone acetate.
6. 7α-methylthioprogesterone.
7. 7α-methylsulfinylprogesterone.
8. 7α-methylsulfinylcortisone 21-acetate.
9. 7α-methylsulfonylcortisone 21-acetate.
10. 7α-acetylthio-9α-fluorohydrocortisone 21-acetate.

References Cited in the file of this patent
UNITED STATES PATENTS 2,904,560   Dodson et al. _____ Sept. 15, 1959
2,908,694   Schaub et al. _____ Oct. 13, 1959

OTHER REFERENCES

Dodson et al.: J.A.C.S., 81, 1224–1227.